(12) United States Patent
Caviglia et al.

(10) Patent No.: US 8,873,948 B2
(45) Date of Patent: Oct. 28, 2014

(54) METHOD AND APPARATUS FOR OPTICAL PATH VALIDATION IN AN OPTICAL NETWORK

(75) Inventors: Diego Caviglia, Savon (IT); Giulio Bottari, Leghorn (IT); Daniele Ceccarelli, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 602 days.

(21) Appl. No.: 13/095,053

(22) Filed: Apr. 27, 2011

(65) Prior Publication Data

US 2012/0237207 A1 Sep. 20, 2012

(30) Foreign Application Priority Data

Mar. 17, 2011 (EP) .................................... 11158734

(51) Int. Cl.
*H04B 10/08* (2006.01)
*H04J 14/02* (2006.01)

(52) U.S. Cl.
CPC ......... *H04J 14/0227* (2013.01); *H04J 14/0267* (2013.01); *H04J 14/0257* (2013.01); *H04J 14/0269* (2013.01); *H04J 14/0268* (2013.01); *H04J 14/0271* (2013.01)
USPC ......... 398/25; 398/17; 398/5; 398/27; 398/28

(58) Field of Classification Search
CPC ..... H04J 3/14; H04B 10/032; H04B 10/0771; H04B 10/0791
USPC .............. 398/10, 17, 25, 26, 27, 28, 29, 5, 57
See application file for complete search history.

(56) References Cited

U.S. PATENT DOCUMENTS

| | | | | |
|---|---|---|---|---|
| 6,324,162 | B1 * | 11/2001 | Chaudhuri | 370/225 |
| 6,934,469 | B2 * | 8/2005 | Feinberg et al. | 398/5 |
| 7,274,869 | B1 * | 9/2007 | Pan | 398/5 |
| 7,301,973 | B2 * | 11/2007 | Shouji et al. | 372/20 |
| 7,474,850 | B2 * | 1/2009 | Sadananda et al. | 398/2 |
| 7,746,814 | B2 * | 6/2010 | Caviglia et al. | 370/312 |
| 7,831,144 | B2 * | 11/2010 | Emongkonchai | 398/2 |
| 7,929,861 | B2 * | 4/2011 | Solheim et al. | 398/34 |

(Continued)

FOREIGN PATENT DOCUMENTS

WO    WO 2008/145067    12/2008

OTHER PUBLICATIONS

European Search Report for EP Application No. 11 15 8734 mailed Sep. 19, 2011.

(Continued)

*Primary Examiner* — Daniel Washburn
*Assistant Examiner* — Hibret Woldekidan
(74) *Attorney, Agent, or Firm* — Nixon & Vanderhye P.C.

(57) ABSTRACT

A border node of an optical network receives optical channel traffic parameter(s) associated with an optical channel from an optical channel originator external to the optical network. The received parameters are used to determine the suitability of at least one optical path within the optical network for an externally originating optical channel. If a suitable optical path is determined, an optical channel availability message indicating the availability at the border node of an optical path within the optical network for the optical channel is sent to the optical channel originator. The optical channel originator determines an available optical channel status of the optical channel from the received optical channel availability message for the optical channel.

22 Claims, 9 Drawing Sheets

(56) References Cited

U.S. PATENT DOCUMENTS

| | | | |
|---|---|---|---|
| 7,995,914 B2* | 8/2011 | So | 398/5 |
| 8,165,012 B2* | 4/2012 | Martinotti et al. | 370/216 |
| 8,203,931 B2* | 6/2012 | Caviglia et al. | 370/216 |
| 8,521,022 B1* | 8/2013 | Sriram et al. | 398/57 |
| 8,711,719 B2* | 4/2014 | Bottari et al. | 370/252 |
| 2002/0063915 A1* | 5/2002 | Levandovsky et al. | 359/110 |
| 2002/0097461 A1* | 7/2002 | Patel et al. | 359/110 |
| 2008/0291924 A1* | 11/2008 | Ishii | 370/400 |
| 2008/0298805 A1* | 12/2008 | Lee et al. | 398/48 |
| 2010/0220996 A1* | 9/2010 | Lee et al. | 398/25 |
| 2012/0148234 A1* | 6/2012 | Bellagamba et al. | 398/28 |
| 2012/0163390 A1* | 6/2012 | Iovanna et al. | 370/400 |
| 2012/0230674 A1* | 9/2012 | Yuan et al. | 398/17 |
| 2012/0287948 A1* | 11/2012 | Ruffini et al. | 370/503 |
| 2013/0163981 A1* | 6/2013 | Ceccarelli et al. | 398/2 |
| 2013/0201402 A1* | 8/2013 | Su et al. | 348/649 |
| 2014/0029416 A1* | 1/2014 | Ceccarellli et al. | 370/225 |

OTHER PUBLICATIONS

Bernstein et al., Optical Inter Domain Routing Consideration, IETF-Standard-Working-Draft, Internet Engineering Task Force (IETF), vol. IPO, Nov. 1, 2001, XP015020469.

Lee et al., Framework for GMPLS and PCE Control of Wavelength Switched Optical Networks (WSON), Internet Engineering Task Force (IETF), vol. CCAMP, No. 2, Mar. 4, 2009.

Pan et al., Fast Reroute Extensions to RSVP-TE for LSP Tunnels; rfc4090.txt, IETF Standard, May 1, 2005, XP015041909.

\* cited by examiner

METHOD AND APPARATUS FOR OPTICAL PATH VALIDATION IN AN OPTICAL NETWORK

This application claims priority to EP Application No. 11158734.1 filed 17 Mar. 2011, the entire contents of which is hereby incorporated by reference.

TECHNICAL FIELD

The invention relates to a method in a border node of an optical network and in an external optical channel originating apparatus and to a border node of an optical network and a router. The invention is particularly applicable to optical path validation in an optical network for an externally originating optical channel. The invention may be used during optical path fault recovery.

BACKGROUND

It is anticipated that Internet Protocol (IP) traffic will be an important traffic type in future communication transport networks such as networks using Dense Wavelength Division Multiplexing (DWDM).

A wavelength switching optical network (WSON) using dense wavelength division multiplexing (DWDM) may be formed by a plurality of interconnected reconfigurable optical add drop multiplexers (ROADM).

At the interface between an IP network and a wavelength switching optical network (WSON) an IP border node IP router is typically coupled to two wavelength switching optical network WSON border node reconfigurable optical add drop multiplexers (ROADM).

The IP router is provided with transponders/DWDM interfaces, used to form an optical channel carrying an IP traffic channel. The reconfigurable optical add drop multiplexers (ROADM) of the wavelength switching optical network (WSON) are able to route an optical signal through the wavelength switching optical network (WSON) until the optical signal arrives at a wavelength switching optical network WSON border node coupled to a destination IP router.

If a fault within the wavelength switching optical network (WSON) is detected by the IP router, the IP router is able to re-route the traffic channel to the second border node of the wavelength switching optical network (WSON) for transport within the wavelength switching optical network (WSON) to the destination IP router, thus providing fault resiliency for a single fault.

However, if a fault develops on the new optical channel path through the wavelength switching optical network (WSON) the IP router is unable to re-route the traffic channel.

The present invention seeks to provide a novel method and apparatus for optical path validation in an optical network that alleviates or ameliorates at least some of the disadvantages of the prior art.

SUMMARY OF THE INVENTION

According to a first aspect of the invention there is provided a method in a border node of an optical network. In a first step, optical channel traffic parameters associated with an optical channel are received from an optical channel originator external to the optical network. In a second step the suitability of at least one optical path within the optical network for an externally originating optical channel is determined using the received optical channel traffic parameters. In a third step, in response to a positive determination of a suitable optical path, an optical channel availability message indicating the availability at the border node of an optical path within the optical network for the optical channel is sent to the optical channel originator In some embodiments in which the optical network comprises a plurality of nodes and links between the nodes, optical network information relating to at least some of nodes or links forming the optical path within the optical network and one or more received optical channel traffic parameters are used to determine the suitability of the optical path for the optical channel.

In some embodiments of comprises the quality of transmission for the optical channel with the received associated optical channel traffic parameter along at least one optical path in the optical network is used to determine the suitability of an optical path.

In some embodiments, in response to a positive optical path determination, an optical channel status record in the border node is updated.

In some embodiments the suitability of at least one optical path is carried out in response to the detection of the failure of an existing optical path.

In some embodiments the suitability of at least one optical path is determined in response to the receipt of at least the optical channel traffic parameters associated with an optical channel.

In a second aspect of the invention there is provided a method in an optical channel originator external to an optical network. In a first step optical channel traffic parameters associated with an optical channel originating at the optical channel originator are sent to a border node of the optical network. In a second step an optical channel availability message indicating the availability at the optical network border node of an optical path within the optical network for the optical channel with which the optical channel traffic parameters are associated is received. In a third step an available optical channel status of the optical channel is determined from the received optical channel availability message for the optical channel.

In some embodiments an optical channel status record in the optical channel originator is updated with the available optical channel status of the optical channel.

In some embodiments the method also includes a step of detecting a fault on the optical channel, and re-routing the client traffic carried by the optical channel to a second border node of the optical network on a second optical channel. In a further step the optical channel traffic parameters associated with the optical channel with a detected fault are sent by the optical channel originator to the border node of the optical network in response to the detection of a fault on the optical channel.

In some embodiments, the optical channel originator external to the optical network is a router.

In some embodiments the optical channel traffic parameters are parameters affecting the quality of transmission of the optical channel in the optical network.

In some embodiments the optical channel traffic parameters associated with an optical channel relate to at least the data rate of a traffic channel carried by the optical channel and the modulation scheme used to modulate a traffic channel onto the optical channel.

In some embodiments the optical channel traffic parameters are transferred between optical channel originator and border node using a link management protocol.

In some embodiments the link management protocol defines a data link object defining the bit rate of the traffic channel.

In some embodiments the link management protocol defines a data link object defining the modulation format of the traffic channel.

In some embodiments the link management protocol is the link management protocol described in IETF Link Management Protocol RFC 4204.

In some embodiments the optical network is a Dense Wavelength Division Multiplexing network or a Coarse Wavelength Division Multiplexing network.

In some embodiments the optical channel availability message is sent via resource reservation protocol IETF RFC 3209.

In a third aspect of the invention there is provided a border node of an optical network coupled to an external optical channel originator and arranged to receive at least one optical channel from the external optical channel originator. The border node comprises a parameter receiving element, coupled to the external optical channel originator for receiving optical channel traffic parameters associated with the optical channel. The border node comprises an optical path determining element, for determining, using the received optical channel traffic parameters, the suitability of at least one optical path within the optical network for an externally originating optical channel. The border node also comprises a channel status messaging element coupled to the external optical channel originator and operable to send to the optical channel originator an optical channel availability message indicating the availability at the border node of an optical path within the optical network for the optical channel in response to a positive determination of a suitable optical path.

In some embodiments the border node has an optical network information store for storing optical network information relating to the optical network, and the optical path determining element is coupled to the optical network information store and uses the optical network information and the optical channel traffic parameters to determine the suitability of at least one optical path within the optical network for an externally originating optical channel.

In some embodiments the optical path determining element comprises a path computation module and a path validation module. The path computation module determines the quality of transmission of an optical channel along an optical path. The path validation module is coupled to receive the quality of transmission from path computation module and to determine that the optical path is a suitable optical path if the quality of transmission is better than a permissible quality level.

In accordance with a fourth aspect of the invention there is provided a router. The router comprises a communication element operatively coupled to a border node of an optical network, the communication element being arranged to send optical channel traffic parameters relating to an optical channel to the border network node. The router also comprises an optical channel store for storing optical channel records. The router also comprises an availability receiver coupled to the border network node and arranged to receive there-from an optical channel availability message indicating the availability at the optical network border node of an optical path within the optical network for the optical channel with which the optical channel traffic parameters are associated; and operable to determine an available optical channel status of the optical channel from the received optical channel availability message, and to update the optical channel record for the optical channel in response to the received optical channel availability information.

DETAILED DESCRIPTION

The present invention relates to the determination of the suitability of an optical path in an optical network for an optical channel originating outside the optical network. One situation in which embodiments of the invention may be used is to provide optical path validation to provide fault recovery in the optical network for optical channels originating outside the optical network.

Figure 1:
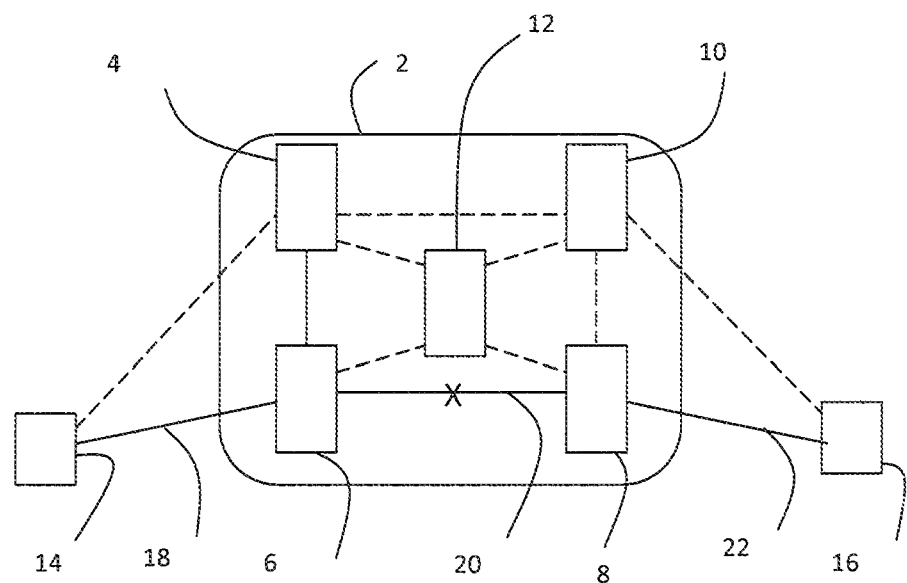
FIG. 1 is a schematic drawing showing an exemplary optical network.

One situation in which embodiments may be implemented is shown in FIG. 1.

FIG. 1 shows an exemplary optical network 2. In the exemplary optical network 2 there are five core nodes 4, 6, 8, 10 and 12 that are provided with optical connections between them. It will be understood that in a typical optical network will have many more core nodes, which may be coupled together in any configuration as seems appropriate to a skilled person.

Typically the core nodes 4-12 are reconfigurable optical add drop multiplexers (ROADMs) and are able to route optical signals through the optical network 2 as will be known to a skilled person.

As will be appreciated by a skilled person, on each of the links between optical network core nodes 4-12 a plurality of different wavelengths can be combined into a single optical signal to be sent over a link between adjacent cores. Each of the plurality of wavelengths provides an optical channel onto which a traffic channel can be modulated.

As will be described later with reference to FIGS. 7-9, each of the core nodes stores optical channel information enabling the routing of optical channels through the network.

Two internet protocol (IP) routers 14, 16 are provided. Each of routers 14, 16 is operatively coupled to two border core nodes within the optical network 2. In the exemplary arrangement shown in FIG. 1, the router 14 is operatively coupled to a border core node 6 and core node 4, and the router 16 is operatively coupled to a border node 8 and to a border node 10.

During operation of the arrangement shown in FIG. 1, an optical channel originated by one of the IP routers 14, 16 is sent to the other of the IP routers 14, 16 via the optical network 2. Thus, in the exemplary arrangement shown in FIG. 1, the solid line denotes an optical channel originating at the IP router 14 and being sent on a link 18 to the border core node 6 of the optical network 2. Within the optical network 2, the optical channel is sent on a link 20 to the border core node 8. In turn the border core node 8 sends the optical channel to the router 16 via an optical link 22. The router 16 terminates the optical channel that originated at the router 14 to recover the traffic channel data.

As will be apparent, a fault may develop in the optical path for the optical channel within the optical network 2. A method of operation carried out when a fault develops in an optical channel link in an optical network in accordance with some embodiments will now be described with reference to FIG. 2, which is a flow chart showing a fault recovery operation in accordance with a first embodiment. Steps that are known or that are not necessary to at least some embodiments of the invention have been shown in dashed lines.

Figure 2:
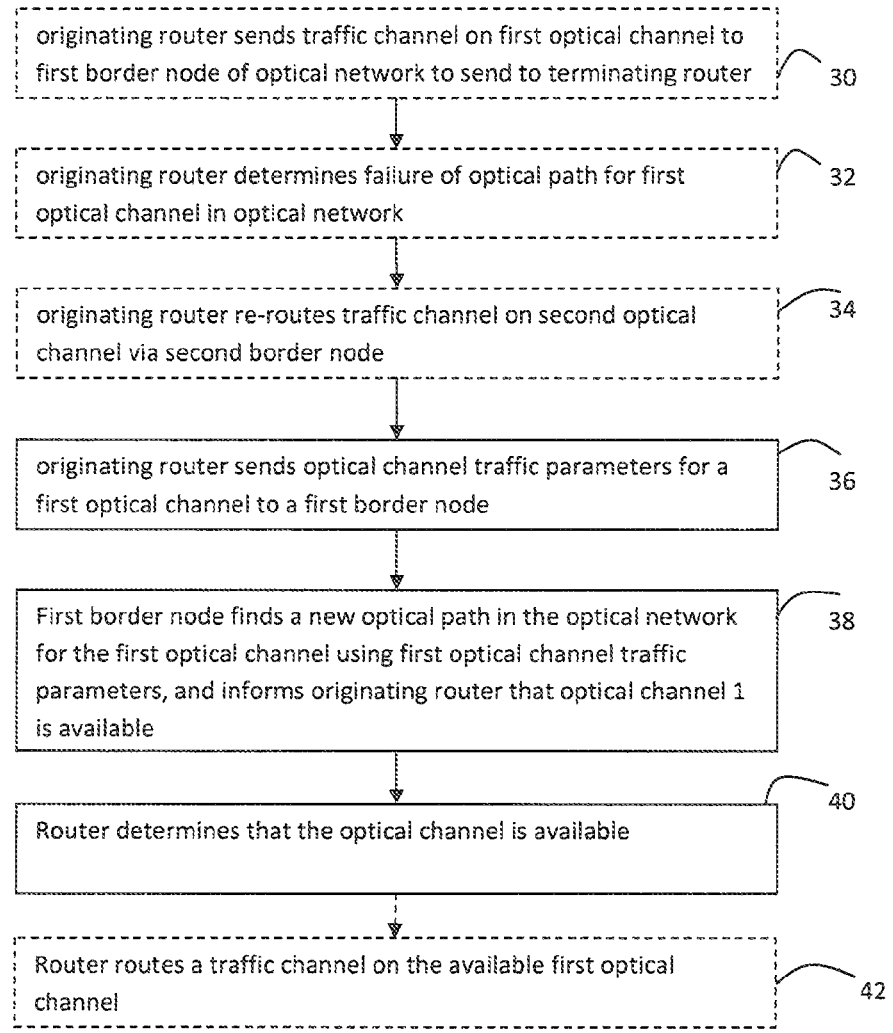
FIG. 2 is a flow chart showing a fault recovery operation in accordance with a first embodiment.

In a first step, as shown in step 30 of FIG. 2, the originating router 14 shown in FIG. 1 sends a first optical channel carrying a traffic channel to the border node 6 of the optical network 2. The optical channel follows an optical path through the optical network 2 to reach the border node 8. The border node 8 of the optical network 2 forwards the optical channel to the router 16 and the optical channel is terminated at the router 16.

If the optical path through the optical network for the optical channel fails, as shown by the cross on link 20 between border nodes 6 and 8 in FIG. 1, in step 32 of FIG. 2 the originating router 14 determines failure of the optical path for the first optical channel. The determination of the failure of the optical path or a link between adjacent nodes in an optical network 2 can be made in different ways in different embodiments, as will be apparent to a skilled person, and so further detailed discussion of the mechanisms that may be used to detect failure of the optical path will be omitted.

Once the failure of the optical pathway through the optical network 2 has been determined in step 32 of FIG. 2, in step 34 of FIG. 2 the originating router 14 re-routes the traffic channel to a second optical channel through the optical network 2. This may be achieved in a short space of time, for example, using a fast optical channel re-route technique, such as the fast re-route method discussed in P. Pan et al. RFC4090 "Fast Reroute Extensions to RSVP-TE for LSP Tunnels" or in any other way as will be apparent to a skilled person.

Figure 3:
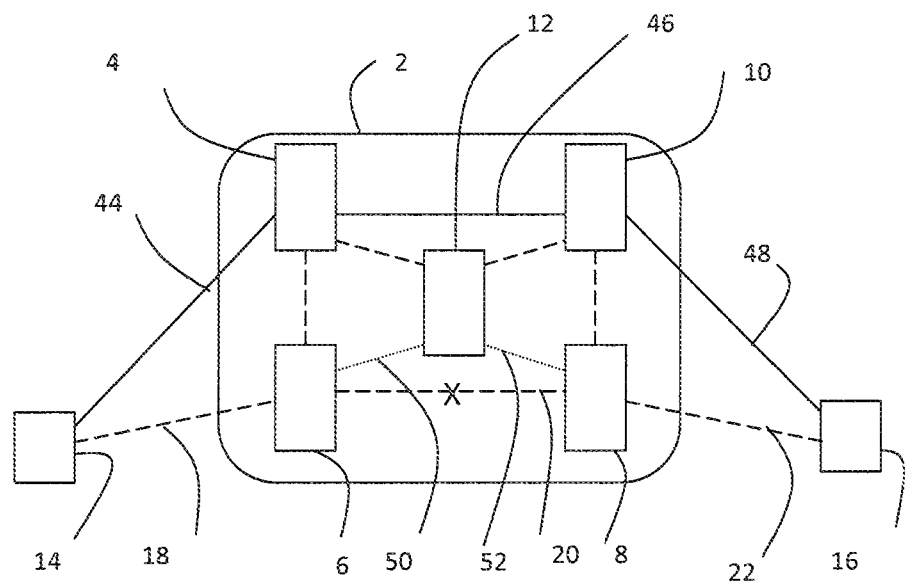
FIG. 3 is a schematic drawing showing the optical network shown in FIG. 1 during a first fault recovery stage.

FIG. 3 shows the optical path for the second optical channel through the optical network 2. Elements in FIG. 3 that are the same as corresponding elements in FIG. 1 have been given the same reference numerals.

As can be seen in FIG. 3 the second originating optical channel originating at the router 14 is sent to the second border node 4 using optical link 44. The second border node 4 forwards the received optical channel along an optical path 46 within the optical network 2. Once the border node 10 has received the optical channel, the optical channel can be forwarded to the optical channel terminating router 16 using optical link 48.

This re-routing of the traffic channel onto a second optical channel when a fault with the optical path of a first optical channel is detected operates effectively to provide fault protection for the fault in path 20. However, the fault in the path 20 renders the optical path 20 through the optical network 2 between the border nodes 6 and 8 inoperable, and therefore a fault that develops subsequently within the optical path 46 shown in FIG. 3 cannot be recovered.

In accordance with one embodiment of the invention, the border core 6 is able to determine an alternative or additional path for an optical channel through the optical network 2. In the exemplary embodiment shown in FIG. 3, the alternative or additional path is formed from optical link 50 between the border node 6 and the node 12, and the optical link 52 formed between network node 12 and the border node 8.

As will be described later, once an optical path 50, 52 for the first optical channel within the optical network had been validated by the border node 6, the first optical channel becomes available once again despite the presence of the fault on path 20. The first optical channel can then be selected by the router 14 to carry a traffic channel across the optical network 2.

Figure 4:
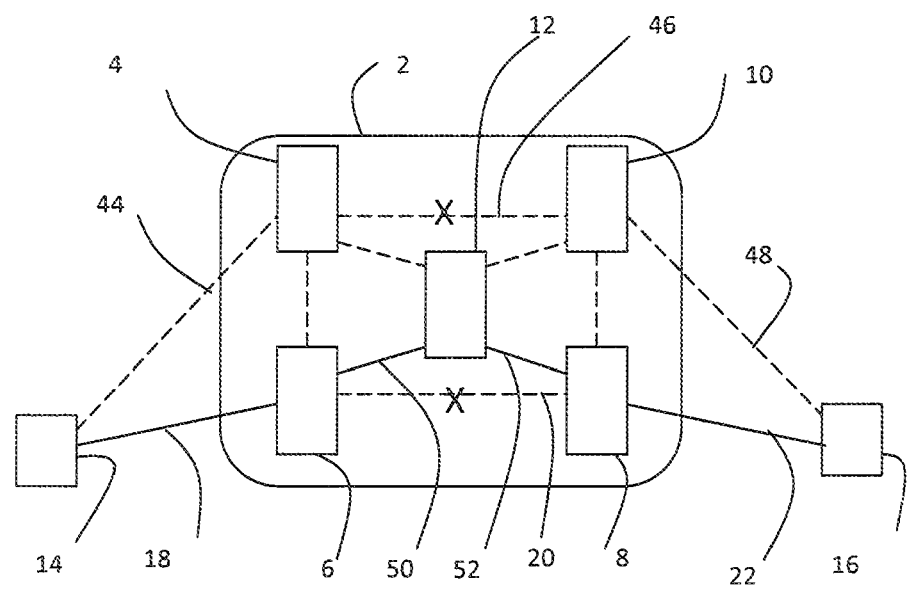
FIG. 4 is a schematic drawing showing the optical network shown in FIG. 1 during a second fault recovery stage.

FIG. 4 shows the situation that arises if a fault occurs in the optical path 46 shown in FIG. 3. In FIG. 4 the same elements as shown in FIGS. 1 and 3 have been given the same reference numerals. In FIGS. 1, 3 and 4 for simplicity only a single traffic channel is considered, and the optical link carrying the exemplary traffic channel is shown in a solid line, and the dashed lines represent possible or potential links for that optical channel or other optical channels.

In FIG. 4 because of the fault in optical path 46 the traffic channel is re-routed from the second optical channel operating via the border nodes 4 and 10 on optical links 44, 48 and optical path 46 through the optical network and routed to the first optical channel routed on optical link 18 to the border node 6; on new optical paths 50, 52 via optical network node 12 to the border node 8 and on optical link 22 to the terminating router 16.

In order for the border node 6 to determine the suitability of an optical path through the optical network for an optical channel the new optical path must be validated for the optical channel. In particular, the effect of physical impairments must be considered during the path computation to be sure that the optical signal has sufficient quality to enable detection of the carried traffic at the receiver interface, which is located on the terminating router 16 in the exemplary embodiment.

In the exemplary embodiment the optical path quality is quantified using a Quality of Transmission (QoT) parameter related to the Bit Error Rate (BER).

Thus, in order to ensure that the path computation provides a suitable optical channel recovery path, the quality of transmission of the optical channel to be carried by the optical channel recovery path must be assessed.

The optical channel is originated and terminated in two routers 14, 16 both outside the optical network 2, and therefore the quality of transmission for the whole of the optical channel length from the originating router 14 to the terminating router 16 should be evaluated. However, the routers 14, 16 and the respective border nodes 6,8 are typically located close together, for example within the same building, with a short optical fiber link typically of the order of less than 100 m, whereas the optical fiber spans within the optical fiber network can be considerable, for example in the order of 100 s of kilometers. For the purpose of quality of transmission calculation, therefore, it can be assumed that the first and the last span introduce a signal degradation which is negligible with respect to the degradation introduced by the sequence of spans in between. In addition, for the purpose of quality of transmission calculation we can assume the conversions between the electrical domain and the optical domain performed by optical interfaces at the routers are instead performed at the border nodes.

As a result of these assumptions, the border node of the optical network connected to the originating router can determine whether an optical path through an optical network is suitable. In the exemplary embodiments this determination is based on a calculated quality of transmission within the optical network.

In accordance with embodiments of the invention, the border node 6 can determine whether an optical path is available using parameters relating to the optical channels such as the nature (rate and modulation format) of the incoming wavelengths.

In some embodiments the information relating to the nature of the externally originating optical channel and optical transmission parameters of nodes and links composing each optical section inside the optical network 2 may be used to determine whether an optical path is suitable for an externally originating optical channel based on a calculated quality of transmission. If the resulting estimated quality of transmission is better than a threshold quality of transmission, the optical path is assumed to be suitable and then considered to be a valid path for the optical channel in the optical network.

Thus in accordance with embodiments of the invention, the router communicates to the border node the signal types produced by their Dense Wavelength Division Multiplexing DWDM interfaces. In other words, the border node is informed of the "nature" of the optical signal originating at the router to enable an effective calculation of a quality of transmission. Typically the border node may be informed of the bit rate (10G, 40G . . . ) and the modulation format (OOK, xPSK) associated with the optical channel.

Returning to the exemplary embodiment of the invention, in step 36, after the originating router 14 re-routes a traffic channel on the second optical channel, in the situation shown in FIG. 2, the originating router 14 sends one or more optical channel traffic parameters for the first optical channel to the first border node 6.

In step 38 of FIG. 2, the first border node 6 finds a new optical path 50, 52 in the optical network 2 for the first optical channel using first optical channel traffic parameters, and informs originating router that optical channel 1 is available.

In step 40 of FIG. 2 the router determines that the first optical channel is available on a viable or suitable optical path. Therefore, in step 42, the router 14 routes a traffic channel on the first optical channel. This may be the same traffic channel that had been switched away to the second channel, or it may be a different traffic channel.

It should be noted that in the exemplary embodiment described above with reference to FIG. 2, the originating router 14 sends optical channel traffic parameters for the first optical channel to a border node of the optical network in step 36 after the failure of the optical path is detected in step 34. However, in other embodiments, the optical channel traffic parameters may be sent to the border node at a variety of times. In particular the optical channel parameters may be sent from the router 14 to the border node 6 at set or at variable intervals.

Figure 5:
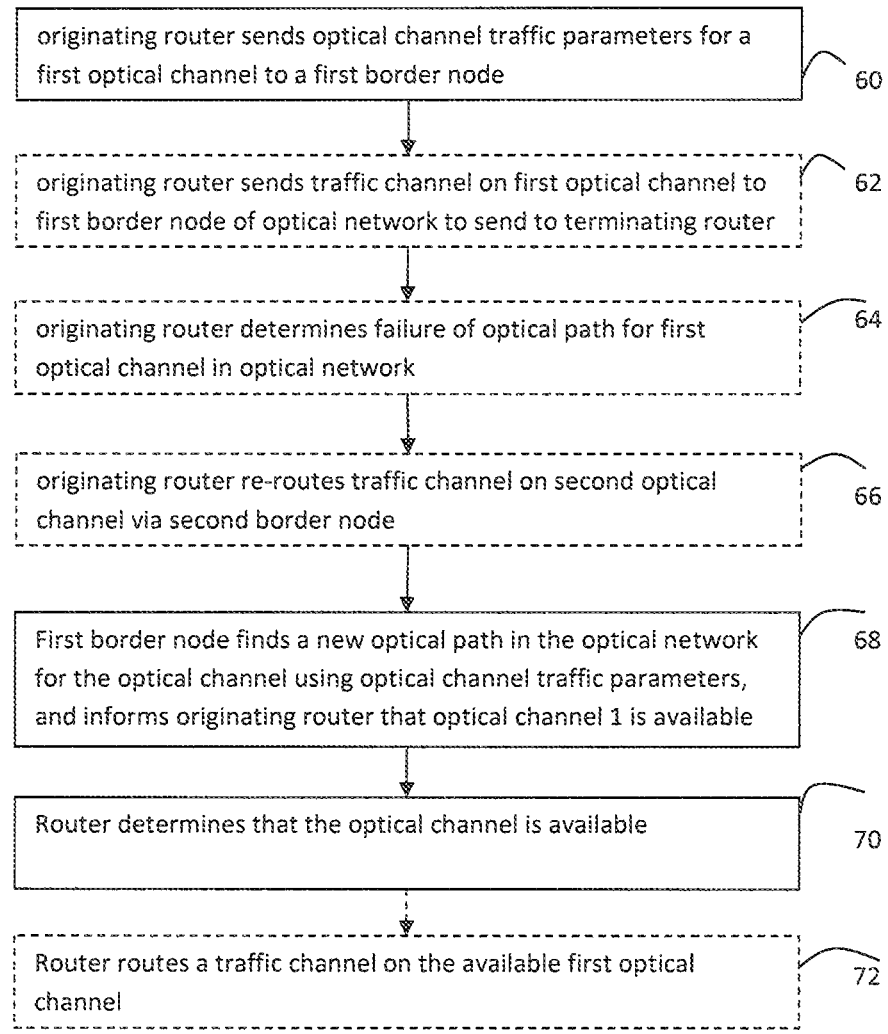
FIG. 5 is a flow chart showing a fault recovery operation in accordance with a second embodiment.

FIG. 5 is a flow chart of an alternative method in which the optical channel traffic parameters are provided, and differs from the flow chart shown in FIG. 2 in the ordering of the method steps. In this embodiment, the originating router sends the optical channel traffic parameters for the optical channel to a first border node in step 60 prior to the detection of any fault with the optical channel.

In step 60 of FIG. 5, the originating router 14 sends optical channel traffic parameters for the first optical channel to the first border node 6.

In step 62 of FIG. 5, the originating router 14 shown in FIG. 1 sends a first optical channel carrying a traffic channel to the border node 6 of the optical network 2, for the optical network 2 to forward to the terminating router 16 of FIG. 1.

In step 64 of FIG. 5, the originating router 14 determines failure of the optical path for the first optical channel in the optical network 2.

In step 66 of FIG. 5, the originating router 14 re-routes the traffic channel onto a second optical channel through the optical network 2.

In step 68 of FIG. 5, the first border node 6 finds a new optical path 50, 52 in the optical network 2 for the first optical channel using optical channel traffic parameters received in step 60 and, if an optical path for the optical channel is available, informs the originating router that optical channel 1 is available.

In step 70 of FIG. 2 the router determines that the first optical channel is available on a viable or suitable optical path.

In step 72, the router 14 routes a traffic channel on the first optical channel. This may be the same traffic channel that had been switched away to the second channel, or it may be a different traffic channel.

In order to communicate the optical channel traffic parameters, in the exemplary embodiment a standard Link Management Protocol (LMP) can be used. In fact the communication is required just between two adjacent nodes (the router 14 and the border node 6) and not across the whole network.

In some embodiments the Link Management Protocol LMP protocol described in IETF RFC 4204 is used. This protocol uses a DATA_LINK object containing a set of sub objects describing the data link characteristic. In embodiments of this invention, a DATA_LINK message carrying the optical characteristic of the link such as the data rate or the modulation format is included.

A DATA_LINK sub-object in accordance with IETF RFC 4204 has the following format set out below. The contents of the DATA_LINK object include a series of variable-length data items called sub-objects. Each sub-object has the form:

```
       0               1
 0 1 2 3 4 5 6 7 8 9 0 1 2 3 4 5
+-+-+-+-+-+-+-+-+-+-+-+-+-+-+-+-+----------------//---------------+
|    Type    |   Length    |       (Sub-object contents)          |
+-+-+-+-+-+-+-+-+-+-+-+-+-+-+-+-+----------------//---------------+
```

The type field is 8 bits long and indicates the type of contents of the sub-object.

Currently defined values in IETF 4204, IETF RFC 4209, and RFC 5818 are:
1 Interface Switching Type
2 Wavelength
3 Link_GroupId
4 SRLG
5 BER_Estimate
6 Optical_Protection
7 Total_Span_Length
8 Administrative_Group
9 Data Channel Status The list of DATA_LINK sub-objects may be extended further to include a bit rate sub-object and a modulation format sub-object. For example these may be arranged as new DATA_LINK sub-objects:
10 Bit rate
11 Modulation Format
or in other suitable ways as will be apparent to a skilled person.

Embodiments of the invention may be implemented in many situations. FIG. 5 shows the operation of an optical channel originator which originates an optical channel and a border node of an optical network. In the exemplary embodiments, the optical channel originator is the router 14 shown in FIG. 1, 3 or 4, and the border node is the border node 6 of the optical network 2.

Figure 6:
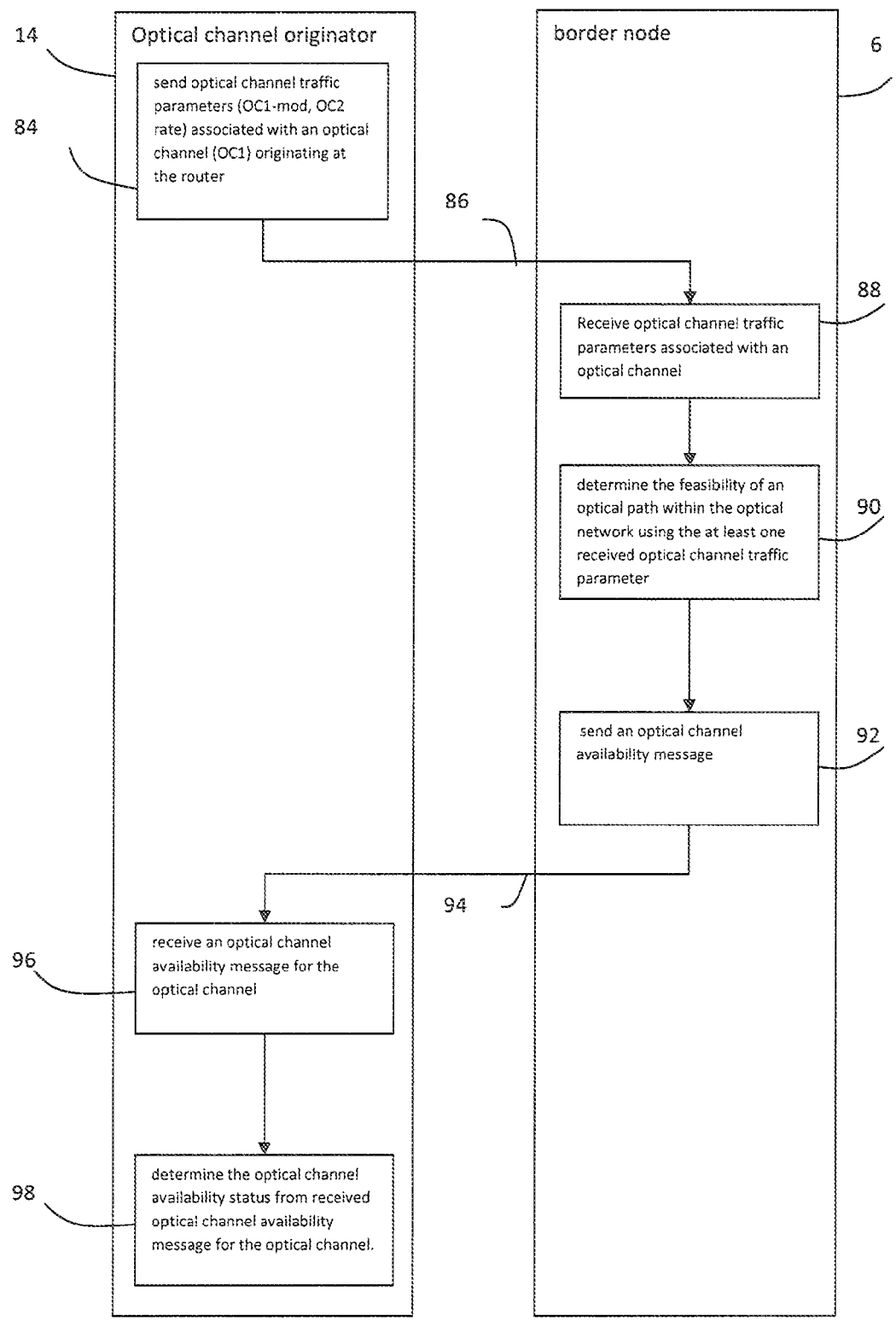
FIG. 6 is a flow chart showing the interaction between a border node and an external optical channel originator during determination of path availability.

In an initial step 84 shown in FIG. 6, optical channel traffic parameters (OC1-mod, OC2 rate) associated with an optical channel (OC1) originating at the router are sent to the border node 6 in a transfer message 86. The optical channel traffic parameters are sent to the border node 6 in order to enable the border node 6 to determine whether a suitable optical path through the optical network can be found for the optical channel having the associated optical channel traffic parameters (OC1-mod, OC2 rate). As described above in the exemplary embodiment the parameters are transferred using a link management protocol.

As is clear from a consideration of FIGS. 2 and 5, this step may be taken in response to the detection of a fault by the optical channel router, or may be taken in advance of the detection of a fault.

In an initial step 88 shown in FIG. 6, the border node 6 receives optical channel traffic parameters associated with an optical channel.

In step 90 the border node 6 determines the suitability of an optical path within the optical network using the received optical channel traffic parameters. The border node will typically take this step in response to the receipt of the optical channel traffic parameters in step 88. However, the border node 6 may in some embodiments take this step in response to the detection of a fault in the optical path for the relevant optical channel by the border node.

In step 92, in response to a positive determination in step 90, an optical channel availability message 94, indicating that a path through the optical network for the optical channel from the border node 6.

In step 96 the optical channel originator, router 14 shown in FIG. 1, receives the optical channel availability message 94 for the optical channel. In some embodiments the optical channel availability message may be a resource reservation protocol (RSVP-TE) message relating to the optical channel, as will be familiar to a skilled person.

In step 98 the optical channel originator, router 14 shown in FIG. 1, determines an optical channel availability status from the received optical channel availability message 94 for the optical channel. Typically an optical channel record for the optical channel in the optical channel router is updated to indicate that the optical channel is available to carry a traffic channel.

Subsequently the first optical channel with the updated path may be selected by the optical channel originator to carry the original traffic channel if the optical path in the optical network for the second optical channel develops a fault. Alternatively the first optical channel is now available for selection by the optical channel originator to carry a further traffic channel to the router 16.

Figure 7:
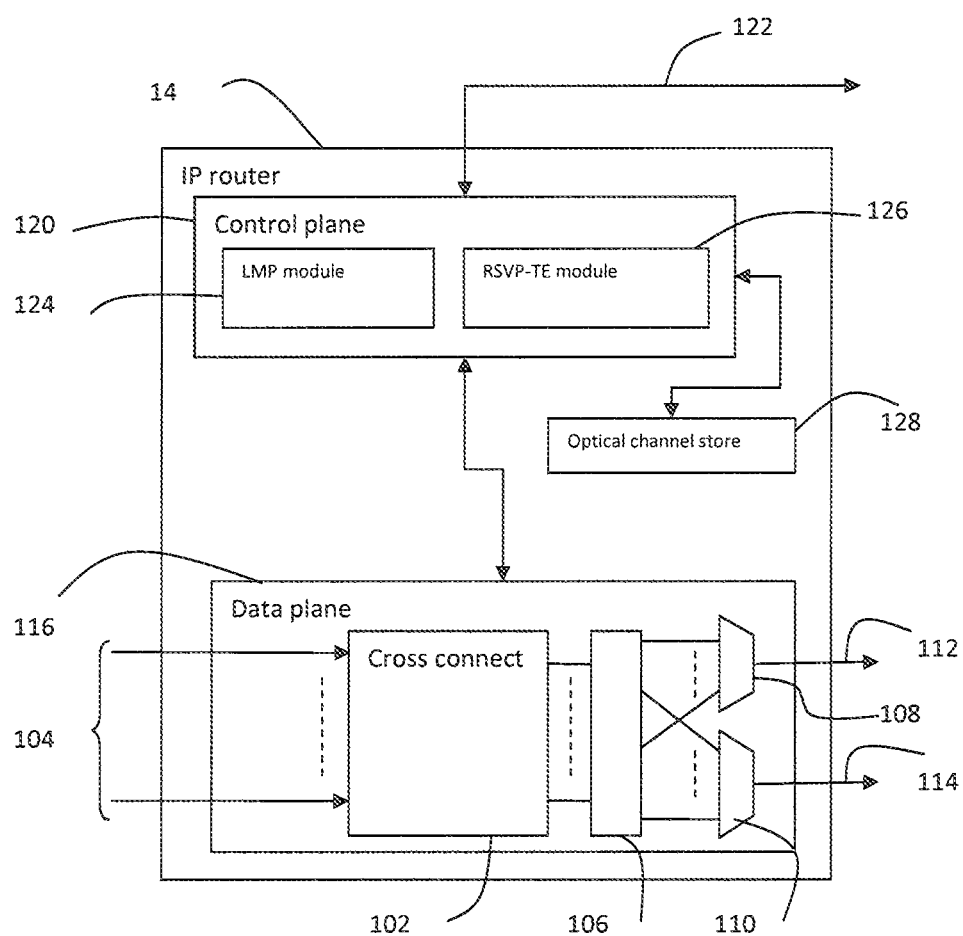
FIG. 7 is a schematic diagram of a router in accordance with one embodiment.

FIG. 7 is a schematic drawing of one embodiment of an IP router 14 that can implement the method of operation described above for an optical channel originator.

The router 14 in accordance with the exemplary embodiment is provided with a cross-connector 102 which is coupled to receive a multiplicity of IP signal traffic channels 104 and to cross-connect them. The cross-connector is coupled to an optical convertor 106 and is arranged to couple the cross-connected traffic channels to an optical convertor 106 to convert the IP signal traffic channels to a plurality of optical signals.

The optical convertor 106 is coupled to multiplexers 108 and 110 and operates to supply the multiplexers 108 and 110 with the optical channels to be sent to border node 4 and 6 respectively. The multiplexers 108, 110 multiplex the optical channels to form respective optical signals 112, 114 to send to the border node 4, 6 of the optical network.

The router 14 is provided with a data plane element 116 including the cross-connecter 102 and operable to control the data plane forwarding. As will be apparent to a skilled person, the data plane element 116 communicated with data plane elements in the border nodes 4 and 6 to provide data plane functionality. The detailed understanding of the operation of data plane processes will be appreciated by a skilled person and is not relevant to the operation of embodiments of the present invention, and therefore will not be explained in more detail.

The router 14 is also provided with a control plane element 120 coupled with the data plane element 116 and operable to control the control plane processes. As will be apparent to a skilled person, the control plane element 120 is also coupled with corresponding control plane elements in the border nodes 4 and 6 to provide control plane communication 122. In particular, as will be described in more detail in the following description the control plane element 120 is provided with a link management protocol (LMP) module 124, arranged for communicating with corresponding link management protocol (LMP) modules in the border nodes 4 and 6. The control plane element 120 is also provided with a resource reservation protocol (RSVP-TE) module 126, arranged for communicating with corresponding resource reservation protocol (RSVP-TE) modules in the border nodes 4 and 6.

Figure 8:
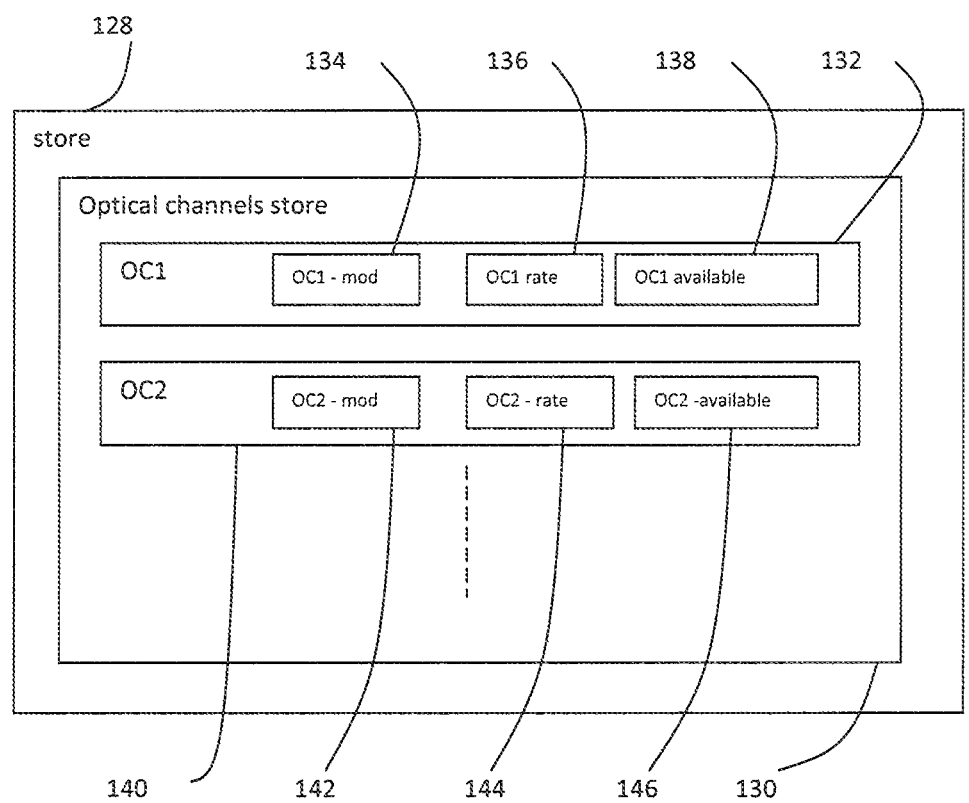
FIG. 8 is a schematic diagram of an optical channel store in the router shown in FIG. 7.

The control plane element 120 also has access to a store 128 in which is stored at least information relating to the optical channels, as will be seen from a consideration of FIG. 8.

FIG. 8 is a schematic drawing of the store 128. In some embodiments the store 128 might be a traffic engineering database. The store 128 is provided with an optical channels store area 130 in which information for the plurality of optical channels originated by the router 14 are stored.

A first optical channel area 132 is provided for recording information regarding a first optical channel OC1. In particular, in the first optical channel area 132 there is stored: first optical channel modulation information 134; first optical channel data rate information; and first optical channel availability information 138.

A second optical channel area 140 is provided for recording information regarding a second optical channel OC1. In particular, in the second optical channel area 140 there is stored: second optical channel modulation information 142; second optical channel data rate information 144; and second optical channel availability information 146.

As will be appreciated by a skilled person, similar optical channel areas for each of the optical channels will be present in embodiments, but have been omitted from FIG. 8 for clarity.

Figure 9:
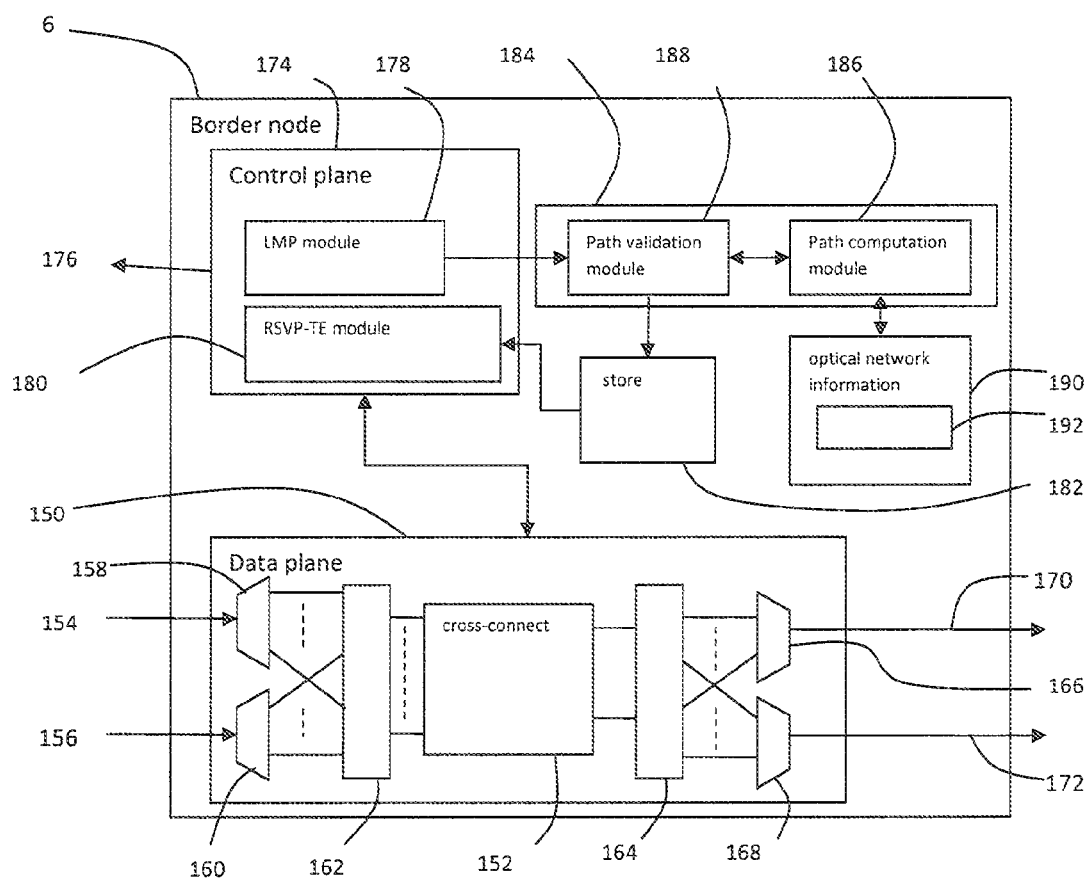
FIG. 9 is a schematic diagram of a border node of an optical network in accordance with an embodiment.

FIG. 9 is a schematic drawing of a border node such as the border node 6 in accordance with one embodiment.

The border node 6 in some embodiments is arranged as a reconfigurable optical add drop multiplexer, as will be appreciated by a skilled person. In the exemplary embodiment the border node 6 is provided with data plane element 150 operable to control the data plane processes. As will be apparent to a skilled person, the data plane element 150 communicates with data plane elements in the router 14 and in other optical network nodes to provide data plane operation. The detailed understanding of the operation of data plane processes will be appreciated by a skilled person and is not relevant to the operation of embodiments of the present invention, and therefore will not be explained in more detail.

The data plane element 150 includes a cross-connector 150 which is arranged to cross-connect optical channels within incoming optical signals to form outgoing optical signals containing the optical channels.

In the exemplary embodiment incoming optical signals 154 and 156 are coupled to respective de-multiplexers 158, 160 which de-multiplex the received optical signals to obtain a plurality of optical channels at different wavelengths.

The de-multiplexers 158, 160 are coupled to supply the plurality of optical channels to an optical convertor 162 to convert to a plurality of electrical signals. The output of the optical convertor is supplied to the cross connect 152. The cross-connector 152 is coupled to an optical convertor 154 and is arranged to couple the cross-connected traffic channels to the optical convertor 164 to convert the cross-connected traffic signals to a plurality of optical signals.

The optical convertor 164 is coupled to multiplexers 166 and 168 and operates to supply the multiplexers 108 and 110 with the optical channels to be sent to other optical network nodes. The multiplexers 166, 168 multiplex the optical channels to form respective optical signals 170, 172 to send to the optical network nodes 12 and 8 of the optical network.

The border node 6 is also provided with a control plane element 174 coupled with the data plane element 170 and operable to control the control plane processes. As will be apparent to a skilled person, the control plane element 174 is also coupled with corresponding control plane elements in the router 14 and to corresponding control plane elements in the other optical network nodes to provide control plane communication 176.

In particular, as will be described in more detail in the following description the control plane element 174 is provided with a link management protocol (LMP) module 178, arranged for communicating with corresponding link management protocol (LMP) modules in the router 14 and to corresponding link management protocol (LMP) elements in the other optical network nodes. The control plane element 174 is also provided with a resource reservation protocol (RSVP-TE) module 180, arranged for communicating with corresponding resource reservation protocol (RSVP-TE) modules in the router 14 and in the other optical network nodes.

The control plane element 174 also has access to a store 182 in which is stored at least information relating to the optical channels. In the exemplary embodiment the store 182 stores information relating to the optical channels in a similar manner to the manner in which information relating to the optical channels is stored in the store 128 as shown in FIG. 8.

Figure 10:
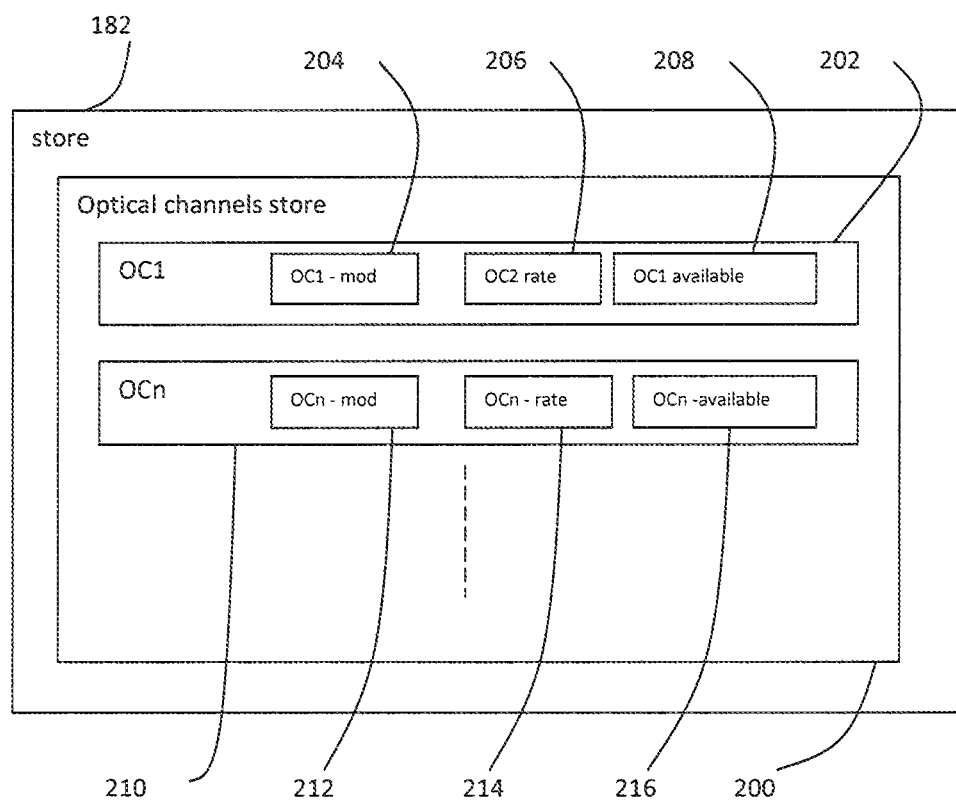
FIG. 10 is a schematic diagram of an optical channel store in the border node shown in FIG. 9.

FIG. 10 is a schematic drawing of the store 182 in the exemplary embodiment of the border node. In some embodiments the store 182 might be a traffic engineering database. The store 182 is provided with an optical channels store area 184 in which information for a plurality of optical channels is stored.

A first optical channel area 186 is provided for recording information regarding a first optical channel OC1. In particular, in the first optical channel area 186 there is stored: first optical channel modulation information 188; first optical channel data rate information 190; and first optical channel availability information 192.

A second optical channel area is provided for recording information regarding a second optical channel OCn. In particular, in the second optical channel area 200 there is stored: second optical channel modulation information 202; second optical channel data rate information 204; and second optical channel availability information 206.

As will be appreciated by a skilled person, similar optical channel areas for each of the optical channels will be present in different embodiments, but have been omitted from FIG. 8 for clarity.

Returning to FIG. 9, the border node 6 also has an optical path validating element 184 that comprises at least a path computation module 186 and a path validation module 188.

The border node 6 is also provided with an optical network information store 190 containing optical network information 192 relating to the optical network. The optical network information 192 in the optical network information store 190 can be accessed at least by the path computation module 186 during operation.

The router 14 shown in FIG. 7 and the exemplary border node 6 according to FIG. 9 may operate in accordance with the flow chart shown in FIG. 6 in the arrangement shown in FIG. 1.

In particular if a router 14 shown in FIG. 7 is used as the optical channel router 14 in FIG. 6, during step 84 the LMP module 124 of the control plane 120 of the router 14 obtains optical channel traffic parameters stored in the optical channel store 128 and sends them to the corresponding LMP module 178 in the control plane 174 of the border node 6. In the exemplary embodiment the LMP module 124 sends the channel modulation OC1-mod 134 and the channel rate OC1 rate 136 as optical channel traffic parameters associated with the optical channel OC1. In the exemplary embodiment the parameters are sent in a link management protocol message, but as will be appreciated other protocols for the transfer of this information may be used in other embodiments.

In the exemplary embodiment the LMP module 178 of the control plane of the border node 6 receives the LMP message 86 containing the optical channel traffic parameters OC1-mod and OC1-rate from the LMP module 124 of the router 14 in step 88 of FIG. 6.

In step 90 of FIG. 6 the optical path validating element 184 determines the suitability of an optical path within the optical network using the received optical channel traffic parameters OC1-mod and OC1-rate. In the exemplary embodiment shown in FIG. 9 the path computation module 186 uses the received optical channel traffic parameters OC1-mod and OC1-rate and the the optical network information 192 to determine a quality of transmission parameter for a candidate optical path through the optical network for an optical channel OC1 having optical channel traffic parameters OC1-mod and OC1-rate. In the case of the exemplary optical network shown in FIGS. 1, 3 and 4, the candidate optical path comprises the optical link 50 between border node 6 and core node 12, and the optical link 52 between core node 12 and border node 8. The path validation module 188 then determines whether the candidate optical path provides a sufficient quality of transmission for the optical channel.

If the candidate optical path does provide a sufficient quality of transmission for the optical channel the OC1 available status 192 is set to available in the optical channel store.

In step 92 an optical channel availability message 94 is returned to the router 14. In the exemplary embodiment this is achieved by the operation of a resource reservation protocol implemented by the resource reservation protocol (RSVP-TE) module 180. The RSVP-TE module 180 sends a protocol message to the RSVP-TE module 126 of the router 14 as an optical channel availability message 94. In some embodiments the optical channel availability message 94 may be sent immediately following the update of the availability status, or in other embodiments the optical channel availability message may be scheduled at intervals, and the change in the available status of optical channel OC1 may be updated in the next scheduled message.

The RSVP-TE module 126 of router 14 in the exemplary embodiment receives the optical channel availability message 94 from the RSVP-TE module 180 in step 96 and determines the optical channel availability status from the received optical channel availability message in step 98.

In embodiments, the RSVP-TE module 126 can then update the channel availability status (OC1 available) 138 in the optical channel store 130. Thereafter, the optical channel OC1 is available once more as a resource for the router to select.

Thus it can be seen that embodiments of the invention provide a method and apparatus that enable an assessment of the suitability of an optical path through an optical network for an optical channel that originates outside the optical network. This makes possible the recovery of multiple faults within the optical network.

The invention claimed is:

1. A method in a first border node of an optical network, comprising the steps of:
   detecting a failure in a first existing optical path within the optical network for a first, externally-originating optical channel;
   receiving, from an optical channel originator external to the optical network, optical channel traffic parameters associated with the first, externally-originating optical channel, the optical channel traffic parameters including one or both of a modulation or a transmission rate for the first, externally-originating optical channel;
   determining, using the received optical channel traffic parameters, the suitability of a second optical path within the optical network for the first, externally-originating optical channel, wherein the first existing optical path and the second optical path for the first, externally-originating optical channel include the first border node and the first existing optical path includes one or more optical communication links in the optical network different from the optical communication links in the optical network included in the second optical path; and
   in response to a positive determination of the suitability of the second optical path, sending to the optical channel originator an optical channel availability message indicating the availability at the border node of the second optical path within the optical network for the optical channel.

2. The method as claimed in claim 1, wherein the optical network comprises a plurality of nodes and links between the nodes, and the step of determining the suitability of the new optical path comprises the step of using optical network information relating to at least some of nodes or links forming the new optical path within the optical network and the optical channel parameters to determine the suitability of the new optical path for the externally-originating optical channel.

3. The method as claimed in claim 1, wherein the step of determining the suitability of an optical path comprises the step of determining the quality of transmission for the optical channel with the received associated optical channel traffic parameter along at least one optical path in the optical network.

4. The method as claimed in claim 1, further comprising the step of, in response to a positive optical path determination, updating an optical channel status record in the border node.

5. The method in claim 1, further comprising after the detecting step and before the sending step, re-routing client traffic carried by the first optical channel to a second different border node of the optical network on a second optical channel that uses third optical path with in the optical network different from the first and second optical paths.

6. The method as claimed in claim 1, wherein the step of determining the suitability of the second optical path is carried out in response to the receipt of at least the optical channel traffic parameters.

7. The method as claimed in claim 1, wherein the optical channel originator external to the optical network is a router.

8. The method as claimed in claim 1, wherein the optical channel traffic parameters are parameters affecting the quality of transmission of the optical channel in the optical network.

9. The method as claimed in claim 1, wherein the optical channel traffic parameters are sent by the optical channel originator to the border node of the optical network in response to the detection of a fault on the first optical channel.

10. The method as claimed in claim 1, where the optical channel traffic parameters are transferred between optical channel originator and border node using a link management protocol.

11. The method as claimed in claim 10, wherein the link management protocol defines a data link object defining the bit rate of the traffic channel.

12. The method as claimed in claim 10, wherein the link management protocol defines a data link object defining the modulation format of the traffic channel.

13. The method as claimed in claim 10, wherein the link management protocol is the link management protocol described in IETF Link Management Protocol RFC 4204.

14. The method as claimed in claim 1, wherein the optical network is a Dense Wavelength Division Multiplexing network or a Coarse Wavelength Division Multiplexing network.

15. The method as claimed in claim 1, where the optical channel availability message is sent via resource reservation protocol IETF RFC 3209.

16. A method in an optical channel originator external to an optical network comprising the steps of:
   detecting a failure in a first existing optical path within the optical network for a first optical channel originating at the optical channel originator to a border node of the optical network;
   sending optical channel traffic parameters associated with an optical channel originating at the optical channel originator to a border node of the optical network, the optical channel traffic parameters including one or both of a data rate of a traffic channel carried by the optical channel or a modulation scheme used to modulate a traffic channel onto the optical channel;
   receiving from the border node, in response to the detection of the failure of the first existing optical path, an optical channel availability message indicating the availability at the optical network border node of a second optical path within the optical network for the first optical channel determined using the optical channel traffic parameters, wherein the first existing optical path and the second optical path for the first optical channel include a same first border node in the optical network and the first existing optical path includes one or more optical communication links in the optical network different from the optical communication links in the optical network included in the second optical path; and
   determining an available optical channel status of the second optical channel from the received optical channel availability message for the optical channel.

17. The method as claimed in claim 16, further comprising the step of updating an optical channel status record in the optical channel originator with the available optical channel status of the optical channel.

18. The method as claimed in claim 16, further comprising:
after the detecting step and before the determining step, re-routing client traffic carried by the first optical channel to a second different border node of the optical network on a second optical channel that uses a third optical path with in the optical network different from the first and second optical paths.

19. A first border node of an optical network coupled to an external optical channel originator and arranged to receive a first one optical channel from the external optical channel originator associated with a first optical path in the optical network, comprising:
A detector configured to detect a failure in the first optical path associated with the first channel;
a parameter receiving processor coupled to the external optical channel originator and configured to receive optical channel traffic parameters associated with the optical channel, the optical channel traffic parameters including one or both of a modulation or a transmission rate for the first optical channel; and
an optical path determining processor configured, in response to the detection of the failure of the first optical path, to determine, using the received optical channel traffic parameters, a suitability of a second optical path within the optical network for the first optical channel; wherein the first optical path and the second optical path for the first optical channel include the first border node, and wherein the first optical path includes one or more optical communication links in the optical network different from the optical communication links in the optical network included in the second optical path;
and a channel status messaging processor coupled to the external optical channel originator and configured to send to the external optical channel originator an optical channel availability message indicating the availability at the first border node of an optical path within the optical network for the optical channel in response to a positive determination of the second optical path.

20. The first border node as claimed in claim 19, wherein the border node has an optical network information store for storing optical network information relating to the optical network, and the optical path determining processor is coupled to the optical network information store and is configured to use the optical network information and the optical channel traffic parameters to determine the suitability of the second optical path within the optical network.

21. The first border node as claimed in claim 19, where the optical path determining processor is configured to determine a quality of transmission of an optical channel along an optical path and to determine that the second optical path is a suitable optical path if the quality of transmission of the second optical path is better than a permissible quality level.

22. A router configured for communication with an optical network, the router comprising:
a detector configured to detect a failure in a first existing optical path within an optical network for a first optical channel originating at the optical channel originator to a border node of the optical network;
a communication processor coupled to a border node of the optical network, the communication processor being configured to send optical channel traffic parameters relating to the first optical channel to the border network node, the optical channel traffic parameters including one or both of a data rate of a traffic channel carried by the first optical channel or a modulation scheme used to modulate a traffic channel onto the first optical channel; and
an optical channel store configured to store optical channel records; and
an availability receiver coupled to the border network node and configured to receive therefrom, in response to the detector detecting the failure of the first existing optical path, an optical channel availability message indicating an availability at the optical network border node of a second optical path within the optical network for the first optical channel determined using the optical channel traffic parameters, wherein the first existing optical path and the second optical path for the first optical channel include a same first border node in the optical network and the first existing optical path includes one or more optical communication links in the optical network different from the optical communication links in the optical network included in the second optical path; and
an availability processor configured to determine an available optical channel status of the second optical channel from the received optical channel availability message and to update one of the optical channel records for the second optical channel stored in the optical channel store in response to the received optical channel availability information.

\* \* \* \* \*